May 22, 1928. 1,670,765
H. L. FERRIS
HAY CARRIER
Filed Sept. 20, 1924 5 Sheets-Sheet 2
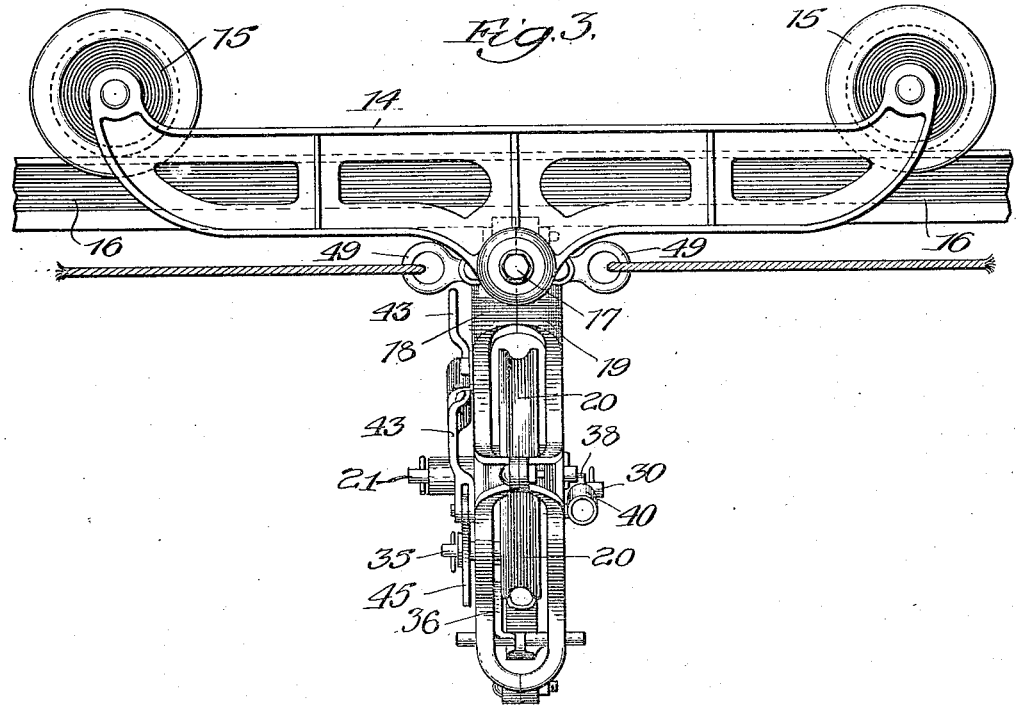
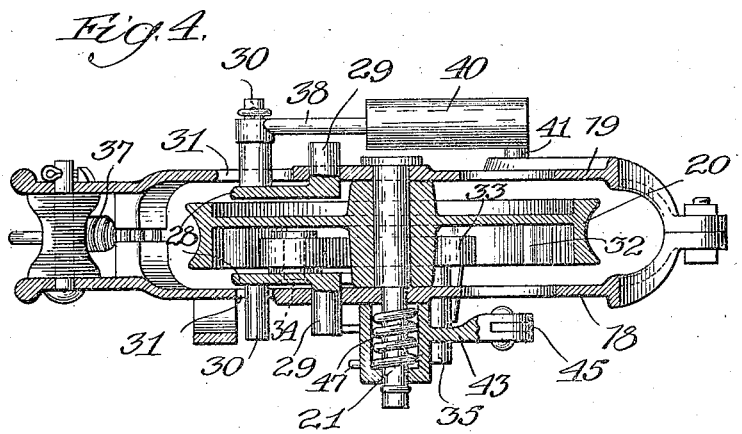
Inventor:
Henry L. Ferris,

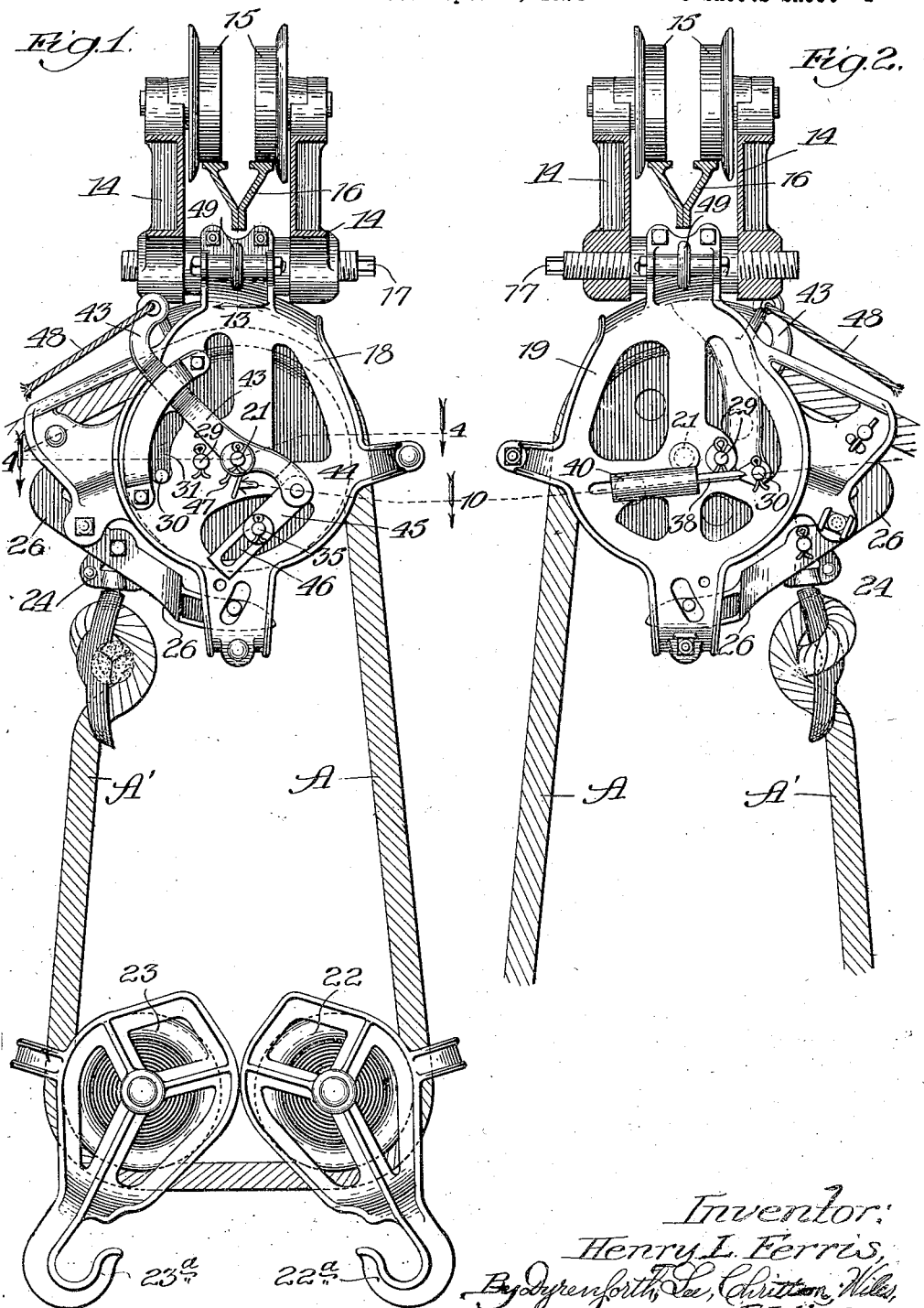

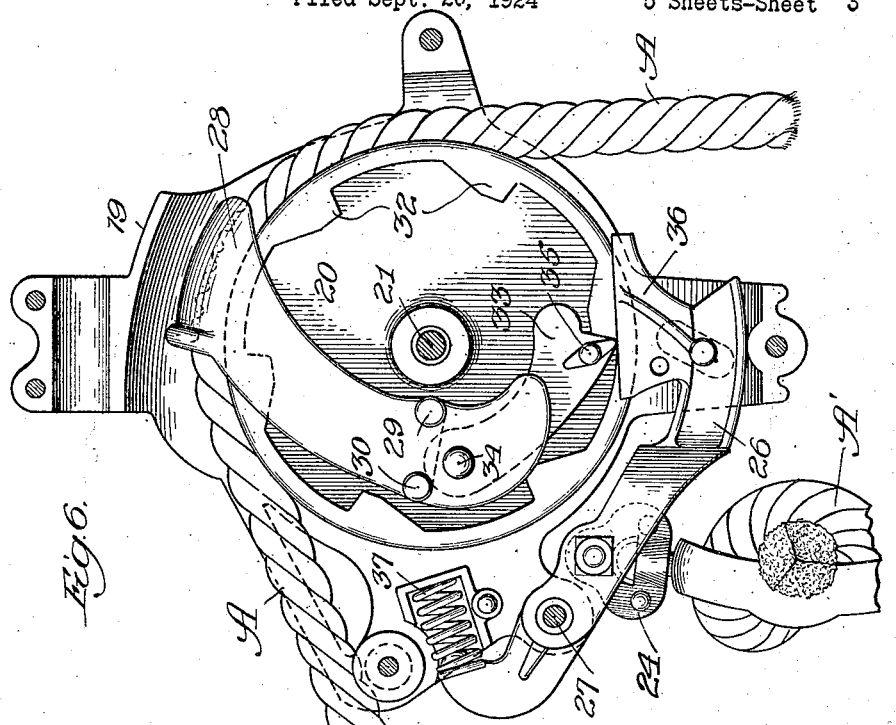
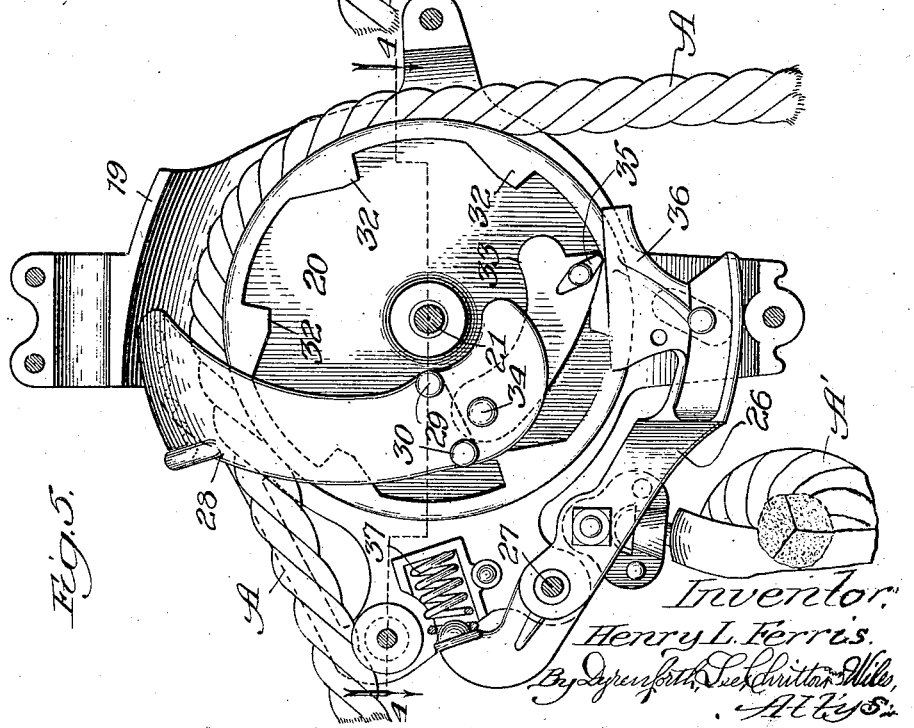

May 22, 1928.
H. L. FERRIS
HAY CARRIER
Filed Sept. 20, 1924  5 Sheets-Sheet 4
1,670,765
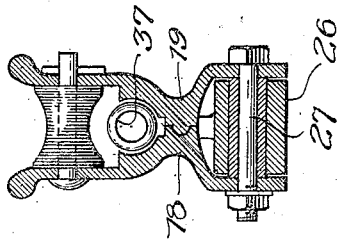
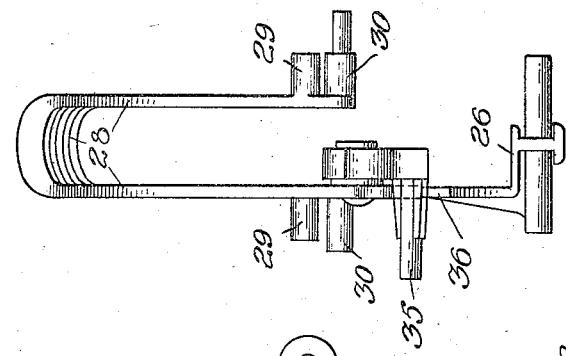
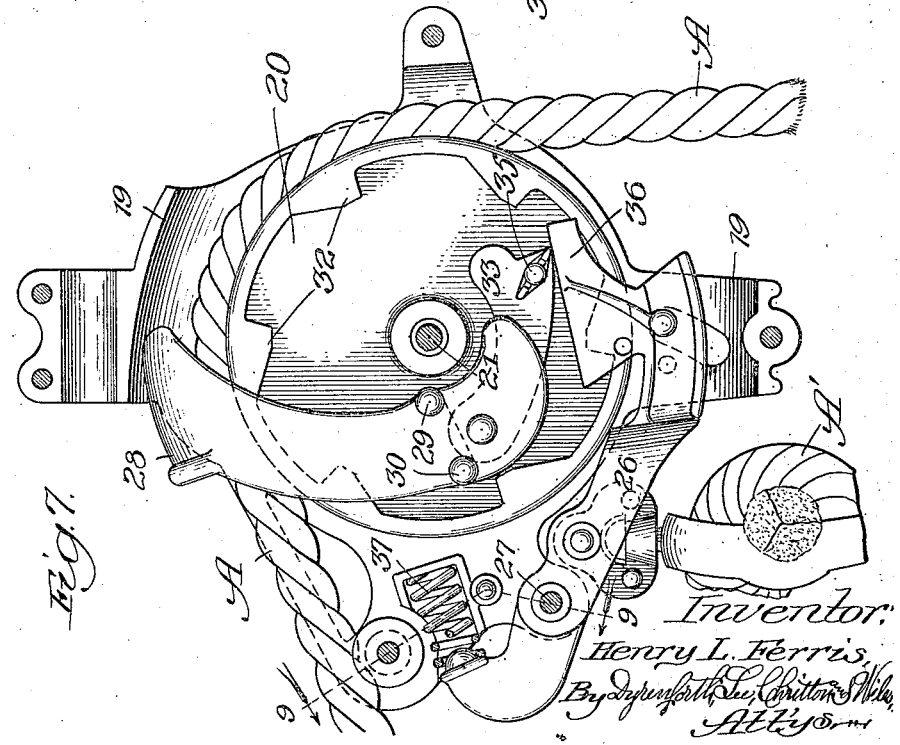
Inventor:
Henry L. Ferris,

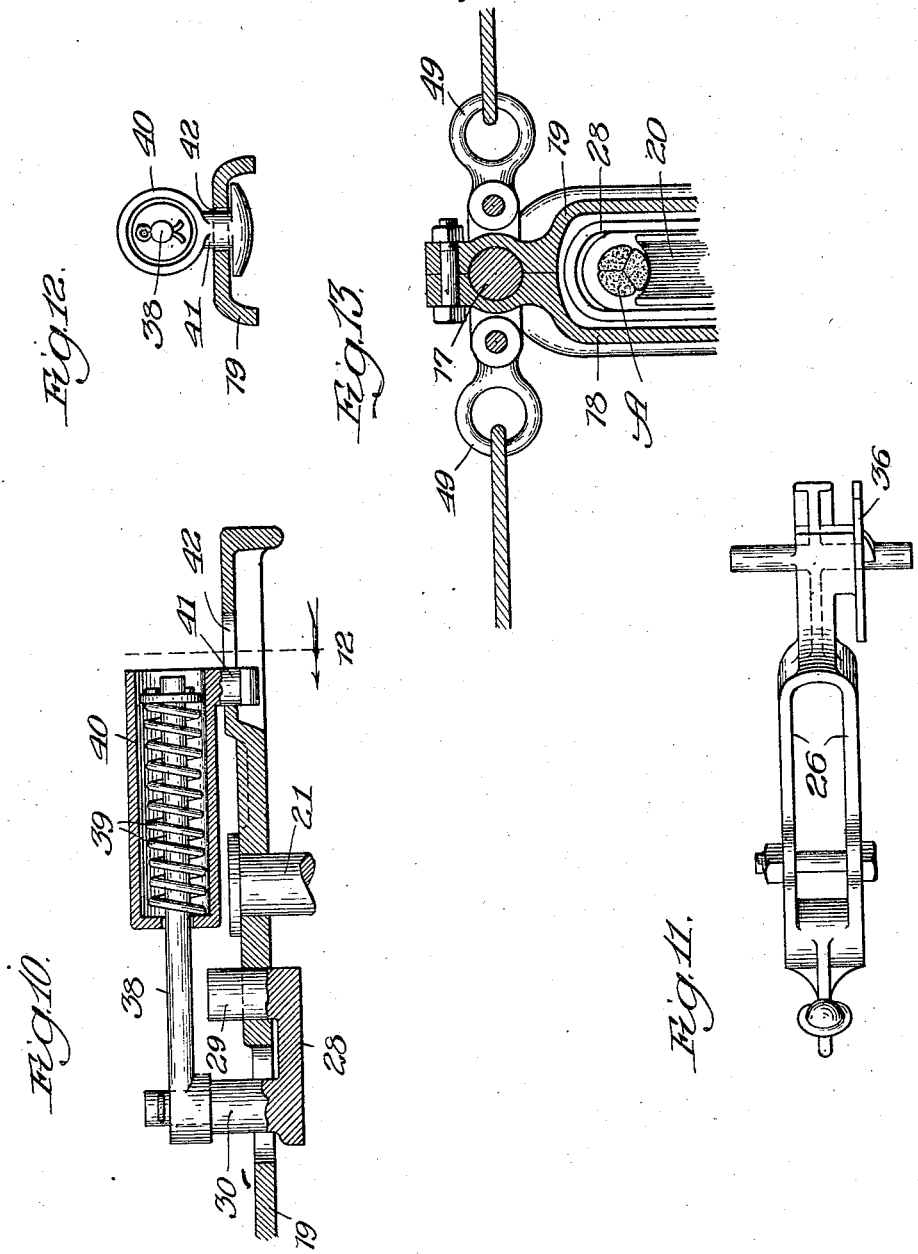

Patented May 22, 1928.

1,670,765

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

HAY CARRIER.

Application filed September 20, 1924. Serial No. 738,817.

This invention relates to hay carriers and more particularly to those which are designated as cross draft hay carriers.

The primary object of the invention is to provide such a carrier with means for automatically gripping the hoisting rope at any desired elevation of the load and for automatically releasing it again by a pull on said rope after the load of hay is dropped.

This and other objects which will appear from the following specification are accomplished by this invention which is fully described in the following specification and shown in the accompanying drawings, in which:

Figure 1 is a front elevation of a hay carrier;

Fig. 2 is a rear elevation of the same;

Fig. 3 is a side elevation as viewed from the right hand side of Fig. 1;

Fig. 4 is an enlarged transverse section on the line 4 of Figs. 1 and 5;

Fig. 5 is an enlarged view of the gripping mechanism similar to Fig. 1, but with the front section of the housing removed;

Fig. 6 is a similar view but showing parts in rope gripping position prior to dropping the load of hay;

Fig. 7 is a view similar to Fig. 6 but showing the gripping mechanism released on dropping the load of hay;

Fig. 8 is a side elevation of the locking arm and pawl releasing arm;

Fig. 9 is a section on the broken line 9—9 of Fig. 7;

Fig. 10 is an enlarged partial view on the line 10 of Fig. 1;

Fig. 11 is a top plan view of the pawl releasing arm;

Fig. 12 is a view on the line 12 of Fig. 10; and

Fig. 13 is a partial section on the line 13 of Fig. 1.

The hay carrier of the embodiment shown is of the cross draft type having a truck 14 at the ends of which are journaled wheels 15 which run upon the track 16. The hay carrier depends from this truck and is pivotally secured thereto by means of a threaded rod 17.

The hay carrier housing consists of two members 18 and 19 secured together by bolts and containing therein a sheave 20 which is journaled upon a pin 21 which passes through the two sections of the housing as shown in Fig. 4. The hoisting rope A passes over the top of the sheave 20 around sheave blocks 22 and 23, the upper end A' of the rope being secured to a member 24 which is pivotally secured at 25 to the pawl releasing arm 26 which in turn is pivotally mounted at 27 between housing members 18 and 19. The operation of this pawl releasing lever will later be explained. The sheave blocks 22 and 23 are provided at their lower ends with hooks 22ª and 23ª which are adapted to receive a rope sling or the like in a well known manner.

An inserted U-shaped locking arm 28 straddles the sheave 20 and has outwardly projecting pins 29 projecting through suitable openings in the housing sections 18 and 19, eccentric to the pin 21 upon which the sheave 20 is mounted, so that as the locking arm 28 is moved to the right as shown in Fig. 6, it will press the rope A firmly down against the face of the sheave thereby firmly gripping it. The locking arm 28 also has a pin 30 projecting from each side and these pins pass through arcuate slots 31 which serve to limit the movement of the locking arm.

The inner surface of the sheave 20 is provided with inwardly projecting teeth 32. The pawl 33 is pivotally connected to one side of the locking arm 28 by means of a rivet 34. This pawl has a lug 35 extending to one side which is adapted to be engaged by the end 36 of the pawl releasing arm 26 which is normally held in the raised position as shown in Fig. 7 by means of the spring 37 acting upon the opposite end of the pawl releasing arm.

When the pawl 33 is so released, the sheave 20 is free to rotate in either direction. When, however, a load of hay or the like is carried by the sheave blocks 22 and 23, the pawl releasing arm 26 is drawn down against the action of the spring 37 as shown in Figs. 5 and 6, thereby permitting the pawl 33 to drop down into contact with the internal teeth 32.

As long as the rope A is drawn so as to lift the load, the sheave 20 will rotate in a clockwise direction as shown in Figs. 5 and 6. When, however, the rope is slackened the sheave 20 will run in the reverse direction causing the teeth 32 to engage the pawl 33 thereby rocking the locking arm 28 about its pivot 29 so that it will assume the position shown in Fig. 6 when the rope will be securely gripped.

When the load of hay in the sling is dropped, the spring 37 forces the pawl releasing arm 26 up thereby raising the pawl 33 so that it clears the teeth 32. A pull on the rope A so as to turn the sheave 20 in a clockwise direction draws the locking arm 28 back causing it to release its grip on the rope A. This action is assisted by the device shown in Figs. 2 and 10 consisting of a link 38 which is pivotally connected at one end to the pin 30, the opposite end of the link extending through a compression spring 39 which is enclosed within the casing 40. This casing is carried by means of an ear 41 in an opening 42 in the housing 19. The centers of the pins 29 and 30 and the ear 41 are substantially in alignment at the time the locking arm is in locking position so that the spring 39 is substantially inoperative at this time. As soon however as the pawl 33 is released by an upward movement of the arm 26 and the rope A is pulled so as to return the locking arm 28 to the unlocked position as shown in Fig. 5, the link 38 falls below the center of the pivot 29 and spring 39 causes the locking arm 28 to snap back into the unlocked position.

It will be seen that by using the weight of the load suspended by the carrier to operate the pawl releasing arm 26, the load may be locked at any desired height by slacking off on the rope A and that the load may be again raised to a higher point by a further pull on this same rope, that after the load carried by this sling is dropped, the gripping device may be released by a further pull on the rope A, after which the sheave 20 is free to move in either direction since the pawl 33 is then held out of operation with the teeth 32 of the sheave 20 by the pawl releasing arm 26.

An additional means for releasing the pawl 33 is provided in a lever 43 which is pivotally mounted upon the end of the pin 21 as shown in Fig. 1, the end of this lever being pivotally connected at 44 to a link 45 which has a slot 46 which passes over the pin 35 on the pawl 33. The lever 43 is normally held in position as shown in Fig. 1 by means of coiled springs 47 passing around the pin 21.

The upper end of the lever 43 has a hole in which is attached a trip rope 48 which may be carried to any convenient point for the operator. As the lever 43 is drawn down by the trip rope 48 the pawl 33 is raised so as to clear the teeth 32 and at the same time the lever 43 engages the pin 30 in the locking arm 28 causing it to move back toward the releasing position, when the link 38 passes the dead center of the pins 39, thereby causing the arm 28 to snap back to the releasing position shown in Fig. 5.

It will be understood that while this extra tripping mechanism is added as an additional tripping means, it is not essential to the operation of the device which will operate automatically according to whether or not the load is applied to the pawl releasing arm 26. If however the operator desires to lower the load without dropping it, this can be done by pulling on the trip rope thereby raising the pawl 33 while the hoisting rope A is held taut and then backing off on the hoisting rope.

The lower end of the housing also acts as a stop for the arm 26 as shown in Fig. 5, thereby taking part of the load of the member 24. At the same time it serves as a stop for the sheave blocks 22 and 23 preventing them from striking other parts of the gripping mechanism.

The truck 14 is provided with eyes 49 to which are attached ropes 50 for moving the truck along the track 16.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a device of the class described, a hoisting sheave over which the hoisting rope runs, a device for locking said rope on said sheave including an eccentrically pivoted locking arm adapted to swing toward the sheave, teeth on said sheave, a pawl carried by said locking arm and lying below the center of said sheave, a pawl releasing arm directly operable on said pawl, a spring normally holding said releasing arm in raised position wherein it will hold said pawl out of contact with said teeth, the free end of the rope passing over said sheave being secured to said pawl releasing arm whereby a load on said rope withdraws said pawl releasing arm, thereby permitting the pawl to engage said teeth.

2. In a device of the class described, a hoisting sheave over which the hoisting rope runs, a device for locking said rope on said sheave including an eccentrically pivoted locking arm adapted to swing toward the sheave, means operable by the weight carried by said rope for controlling said locking arm, and spring actuated means for returning said locking arm independently of the load on the rope to its normally inoperative position when said locking arm has passed a predetermined point in its outward swing.

3. In a device of the class described, a housing, a hoisting sheave over which the hoisting rope runs, a device for locking said rope on said sheave including an eccentrically pivoted locking arm adapted to swing toward the sheave, teeth on said sheave, a pawl carried by said locking arm below the center of the hoisting sheave, and a releasing arm operable by the load on the device adapted to hold said pawl independently of said locking arm out of engagement with said teeth when no load is carried and to permit said pawl to engage said teeth when a load is carried by the device, said housing forming a stop and support for the outer end of said releasing arm.

4. In a device of the class described, a housing, a hoisting sheave journaled in the housing over which the hoisting rope runs, a U-shaped locking arm pivotally mounted at its two ends in said housing and adapted to swing to and from the sheave, a pawl hingedly connected to said locking arm below its pivot point, and a lever journaled in said housing and movable by the weight on rope running over said sheave to operate said pawl.

5. In a device of the class described, a housing, a hoisting sheave journaled in the housing over which the hoisting rope runs, a U-shaped locking arm adapted to swing to and from the sheave, a pawl hingedly connected to said locking arm below its pivot point, and a lever journaled in said housing and movable by the weight on the rope running over said sheave to operate said pawl independently of said locking arm, said housing serving to limit the downward swing of said lever and to protect it from the pulleys carried by the rope beneath said pulley.

6. In a device of the class described, a hoisting sheave over which the hoisting rope runs, a device for locking said rope on said sheave including an eccentrically pivoted locking arm adapted to swing toward the sheave, teeth on said sheave, a pawl carried by said locking arm and lying below the center of said sheave, a pawl releasing arm, a spring normally holding said releasing arm in raised position wherein it will hold said pawl out of contact with said teeth, the free end of the rope passing over said sheave being secured to said pawl releasing arm whereby a load on said rope withdraws said pawl releasing arm, thereby permitting the pawl to engage said teeth, and a hand trip lever pivotally mounted on the axis of the sheave for releasing said locking arm from the rope.

7. In a device of the class described, a housing, a hoisting sheave journaled in the housing over which the hoisting rope runs, a hand trip lever pivoted on the shaft passing through the sheave, a U-shaped locking arm mounted eccentrically to the sheave and adapted to swing to and from the sheave, said arm carrying a pawl below its pivot point, and said hand trip lever connected to said pawl by a link whereby the pawl can be made inoperative by actuating said trip lever.

8. In a device of the class described, a hoisting sheave over which the hoisting rope runs, a device for locking said rope on said sheave including an eccentrically pivoted locking arm adapted to swing toward the sheave, means operable by the weight carried by said rope for controlling said locking arm, and spring actuated means for urging said locking arm toward either its operative or inoperative positions when said locking arm has passed a predetermined mid-point in its swing.

9. In a device of the class described, a housing, a hoisting sheave over which the hoisting rope runs, a device for locking said rope on said sheave including an eccentrically pivoted locking arm adapted to swing toward the sheave, teeth on said sheave, a pawl pivoted to the locking arm below the pivot point of said arm, trip mechanism operably connected to said pawl, and a trip rope for operating said mechanism.

HENRY L. FERRIS.